Aug. 4, 1959  R. J. SLEZAK  2,898,445
PORTABLE WELDING GUN
Filed April 3, 1958  2 Sheets-Sheet 1
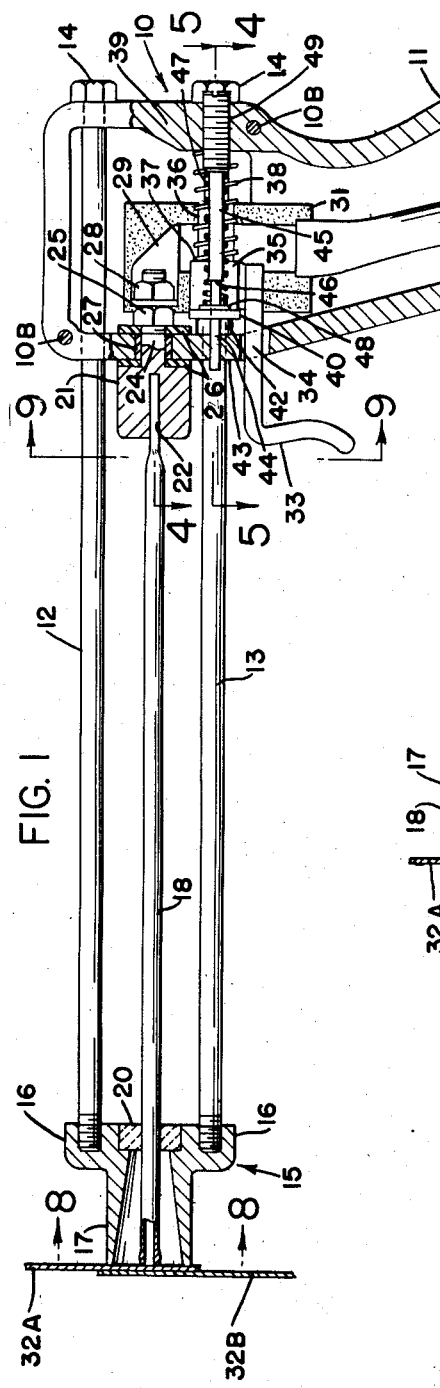
INVENTOR.
RAYMOND J. SLEZAK
BY
ATTORNEYS Aug. 4, 1959 R. J. SLEZAK 2,898,445
PORTABLE WELDING GUN
Filed April 3, 1958 2 Sheets-Sheet 2

INVENTOR.
RAYMOND J. SLEZAK
BY Ely, Frye & Hamilton
ATTORNEYS

United States Patent Office
2,898,445
Patented Aug. 4, 1959

2,898,445

PORTABLE WELDING GUN

Raymond J. Slezak, Barberton, Ohio, assignor of one-half to Schott Metal Products Company, and one-half to RJS Products Company, Inc., both of Akron, Ohio, and both corporations of Ohio Application April 3, 1958, Serial No. 726,090

11 Claims. (Cl. 219—127)

The invention relates to portable welding guns for arc welding, and more particularly to an improved gun which is adjustable to a predetermined feed for each weldment.

In spot arc welding overlapping joints of sheet metal, as in automobile body work, a weld rod mounted in a gun or holder is pressed against the joint and the arc struck between the end of the rod and the work. As the arc melts a spot in the overlapping sheets to be joined, the weld rod is pushed through the molten metal and forms a weldment rivet joining the two sheets of metal. Since a protective eye shield is required, considerable skill is required in positioning the end of the rod at the proper spot, feeding the rod, and removing the gun when the weld is completed. If the gun is removed too soon, a recess is left in the weldment and, if removed too late, the metal around the weldment is burned or buckled, or both.

Certain prior welding gun constructions have been provided with ratchet rack bars designed to feed a predetermined amount of weld rod each time the gun is pushed against a joint, but the feed is not adjustable for different thicknesses of joints, and the rack bar substantially doubles the over-all length of the gun.

An object of the present invention is to provide a novel and improved portable welding gun which feeds an infinitely adjustable predetermined amount of weld rod for each weldment.

Another object is to provide an improved portable welding gun which feeds a predetermined amount of rod for each weldment and is of minimum over-all length.

Other objects include the provision of a simply constructed, inexpensive gun in which the weld rod is exposed, making it easier to load and clean; which can be used for conventional arc welding or burning holes; and which does not require close tolerances between parts as in ratchet and linkage mechanisms.

These and other objects are accomplished by the improvements comprising the present invention, a preferred embodiment of which is shown by way of example in the accompanying drawing and described in detail in the following specification. Various modifications and changes in details of construction are included within the scope of the appended claims.

In the improved gun, the weld rod is secured in exposed position between two laterally spaced guide rods slidable through the housing and mounting a hollow nose between their outer ends, there being a trigger on the housing for operating indexing means in the housing to engage one of the guide rods for moving it in successive steps of predetermined length.

In the drawings:

Fig. 1 is a longitudinal sectional view of the improved gun at the start of a weld, the guide rods slidably connecting the housing and nose being shown in elevation.

Fig. 2 is a fragmentary sectional view of the nose with the weld partially completed.

Fig. 3 is a fragmentary view similar to Fig. 1, at the end of a weld.

Figure 4:
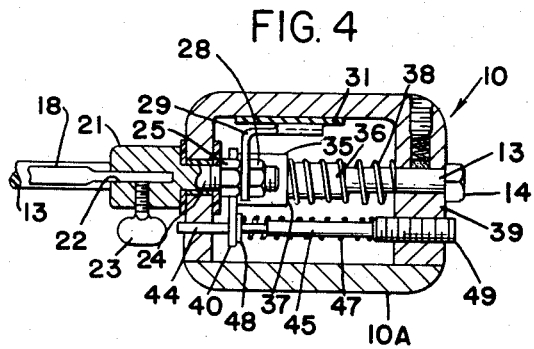
Fig. 4 is a plan sectional view on line 4—4 of Fig. 1.

The body of the improved welding gun comprises a housing, indicated generally at 10, having a hollow handle portion 11 shaped to fit in the hand of the operator. The housing may be cast metal, or molded plastic material, or any suitable material having requisite strength and rigidity. Preferably, the upper portion of the housing is open at one side and has a cover plate 10A removably secured thereon by screws 10B.

A pair of laterally spaced parallel guide rods 12 and 13 extend slidably through the front and rear walls of the upper part of housing 10 and heads 14 are provided on their rear ends to limit forward sliding movement of the rods by abutment with the rear wall of the housing, as shown in Fig. 1.

A tubular welding nose 15 is removably secured on the front ends of the rods 12 and 13, preferably by gripping the heads 14 and screwing the rods into the diametrically opposite ears 16 extending above and below the tubular body 17 of the nose. As shown, the bore of the body 17 may be forwardly flared or tapered divergently to space the tube radially from the end of a weld rod 18 extending axially through the tube. Preferably, the weld rod extends slidably through an insulative washer 20 which may be of ceramic material.

The rear end of weld rod 18 is secured on the front wall of housing 10, preferably by means of a socket member 21 which has a bore 22 receiving the rear end portion of the weld rod. A clamping screw 23 (Fig. 4) extends laterally into the member 21 for engaging the rear end portion of the rod 18. The socket member 21 is secured to the housing wall preferably by means of a neck or stud 24 extending through the wall and having a clamping nut 25 screwed on its inner end. Washers 26 and bushing 27 of insulating material electrically insulate the socket member from the housing.

A second nut 28 may be screwed on the inner end of the socket member stud 23 for electrically connecting it to the terminal 29 of an electrical conductor 30 supplying current from the power supply. An insulating pad 31 is preferably interposed between the housing and the exposed portion of the terminal.

The lengths of the guide rods 12 and 13 are determined by the length of a standard weld rod 18 (which may be of the powdered iron type) to be used in making a series of welds. In other words, referring to Figs. 1, 2 and 3, each time a weld is made to connect the two plates 32A and 32B abutting the nose, a short section of the weld rod is used to form the slug or rivet R extending through the plates, and the rods are retracted a distance substantially equal to the section used. Thus, the rods must be long enough to position the outer end of the nose flush with the outer end of a new weld rod 18 when the rear end is secured in the socket 21, as shown in Fig. 1, but this requires that the over-all length of the gun be only substantially the length of the rods plus the length of the nose.

The indexing mechanism is operated by the trigger 33 which projects forwardly from the housing under the lower guide rod 13 and has a shank 34 extending into the housing 10. The inner end of the shank 34 is secured to the side of a sleeve 35 which is slidable on guide rod 13, and which has a rearwardly extending reduced portion 36 forming an abutment shoulder 37. A helical spring 38 is interposed between the shoulder 37 and a thickened portion 39 on the rear wall of the housing, for urging the sleeve 35 and the trigger 33 attached thereto forwardly.

The front end of the sleeve 35 is formed at exact right angles to the axis of the sleeve and normally abuts one end of a friction latch plate 40 which has a circular aperture 41 engirdling the rod. A spacer sleeve 42 surrounds the rod 13 between the latch plate and the front wall 43 of the housing. The aperture 41 is made slightly larger than the rod 13 so that when the plate is exactly at right angles to the rod 13, as in Fig. 5, the rod will slide freely through the plate, but when the angle of the plate is slightly changed by inclining or canting the plate, as in Fig. 6, the plate will frictionally engage or lock on the rod. I have found that this result is satisfactorily accomplished by making the aperture from .001″ to .005″ larger in diameter than the diameter of the rod.

The other end of the plate 40 fits loosely around a pin 44 extending parallel to the guide rod 13 and mounted in the front and rear housing walls for longitudinal adjustment therein. The pin 44 has an enlarged central portion 45 forming a stop shoulder 46, and a relatively weak helical spring 47 surrounds the pin. One end of the spring 47 engages a washer 48 abutting the said other end of plate 40, and the other end of spring 47 engages a further enlarged threaded portion 49 screwed through the rear wall portion 39 of the housing. The front end of pin 44 is slidable in housing wall 43, so that turning the threaded portion 49 adjusts the location of the stop shoulder 46.

Figure 5:
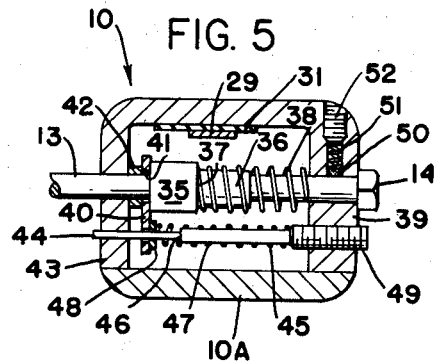
Fig. 5 is a plan sectional view on line 5—5 of Fig. 1.
Figure 6:
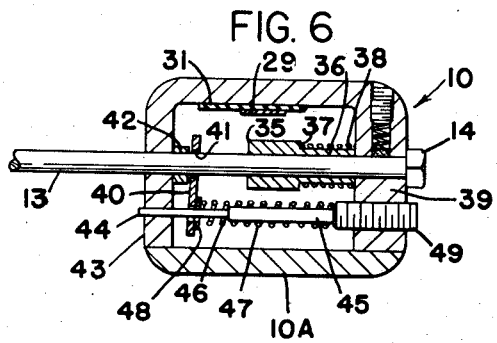
Fig. 6 is a view similar to Fig. 5, showing the position of the indexing mechanism when the trigger is pressed.

The weak spring 47 urges the latch plate 40 toward its canted or latching position on rod 13, but in the normal position of Fig. 5 with the trigger relased, the stronger spring 38 overcomes the effect of spring 47 and holds the bar in unlatched position.

In the operation of the improved gun, a new weld rod is secured in the position of Fig. 1 with the rods 12 and 13 fully extended, or extended to the point where the forward end of the weld rod 18 is flush with the outer end of the nose 17. The conductor 30 is connected to one terminal of the power supply, which may be a commercial power welder, and the plates 32A and 32B constituting the work piece are connected to the other terminal.

Figure 7:
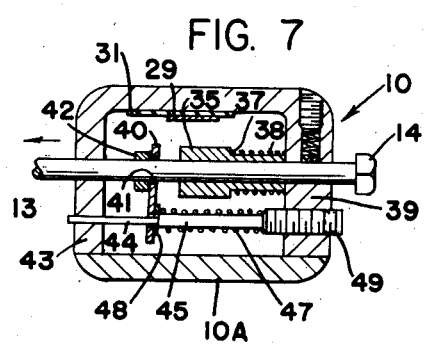
Fig. 7 is a similar view showing the predetermined movement of the guide rod while the trigger is pressed, on line 7—7 of Fig. 3.
Figure 8:
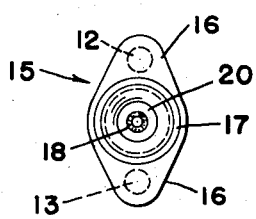
Fig. 8 is an end view of the nose on line 8—8 of Fig. 1.
Figure 9:
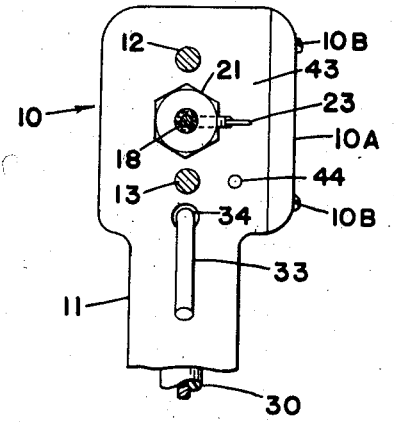
Fig. 9 is a transverse view on line 9—9 of Fig. 1, showing the housing in elevation.

Next the operator presses the trigger 33 and firmly pushes the nose 17 against the plate 33A and continues to push until he feels the latch plate washer 48 strike the stop shoulder 46 on pin 44, and after the arc stops he immediately removes the nose from the work. When the trigger 33 is pressed the parts take the position of Fig. 6, in which the latch plate 40 is engaged with the guide rod 13, and as the operator continues to push the nose against the work the housing will slide forwardly on the guide rods until the washer 48 strikes the stop 46 in the position of Fig. 7.

The location of stop shoulder 46 is predetermined in relation to the nature and gauge of the plates being welded, so that the weld will be completed shortly after the washer strikes the stop, and then by removing the gun a perfect weldment will be made. Successive welds are made by pushing the nose against a flat surface or against the work without pressing the trigger to bring the end of the rod flush, and when the arc strikes, repeating the operation of pressing the trigger and pushing against the work until the latch plate washer strikes the stop shoulder 46. Each time the latch plate and associated mechanism causes a predetermined relative movement between the housing and the nose. Obviously, the amount of this relative indexing movement is capable of adjustment in infinite variations within the limits of the range of screw 49.

As shown in Figs. 4–7, a spring-biased friction pad 50 preferably engages the rod 13 to yieldingly maintain it in any given position when the trigger is pressed to slide the sleeve 35 along the rod. The pad may be urged by a spring 51 held in place by a set screw 52 secured in the rear housing wall 39. Obviously, the pad 50 could be engaged with rod 12, as could the latch plate 40, without affecting the invention.

The novel and improved gun has a minimum over-all length and has the weld rod exposed at all times so that the nature of the weld can be observed and the weld rod easily removed and replaced at all times. Moreover, the exposed rod requires a minimum amount of cleaning and insulation. In the novel construction, the welding nose is easily replaceable with a different size to suit varieties of work and the gun is adapted for conventional welding merely by not using the trigger. The novel indexing mechanism is simple and inexpensive, and does not require close tolerances between a number of connected parts as in ratchet and linkage mechanisms.

What is claimed is:

1. A portable welding gun having a housing, a pair of laterally spaced guide rods extending slidably through and beyond said housing, a hollow nose secured to the rods at one end thereof, means on said housing for insulatively securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, spring means abutting the apertured end of said plate normally to maintain it in unlatched position, spring means abutting the other end of said plate to angle it to latching engagement with said one rod, trigger means to release said first spring means, and a stop to limit bodily movement of said latch plate in latched engagement with said one guide rod.

2. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, spring means abutting the apertured end of said plate normally to maintain it in unlatched position, spring means abutting the other end of said plate to angle it to latching engagement with said one rod, trigger means to release said first spring means, and an adjustable stop to limit bodily movement of said latch plate in latched engagement with said one guide rod.

3. A portable welding gun having a housing, a pair of laterally spaced guide rods extending slidably through and beyond said housing, a hollow nose secured to the rods at one end thereof, means on said housing for insulatively securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, means normally maintaining said plate in unlatched position, a trigger on said housing to release said means, means to angle said plate to latching engagement with said one rod when said plate is released, and a stop to limit bodily movement of said latch plate in latched engagement with said one guide rod.

4. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, means normally maintaining said plate in unlatched position, a trigger on said housing to release said means, means to angle said plate to latching engagement with said one rod when said plate is released, and an adjustable stop to limit bodily movement of said latch plate in latched engagement with said one guide rod.

5. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, spring means normally maintaining said plate in unlatched position, a trigger on said housing to release said means and allow angling of the plate to latching engagement with said one rod, and a stop to limit bodily movement of said latch plate in latched engagement with said one guide rod.

6. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, spring means normally maintaining said plate in unlatched position, a trigger on said housing to release said means and allow angling of the plate to latching engagement with said one rod, and an adjustable stop to limit bodily movement of said latch plate in latched engagement with said one guide rod.

7. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, a spring around said one rod abutting the apertured end of said plate normally to maintain it in unlatched position, a second spring abutting the other end of said plate to angle it into latching engagement with said one rod, a trigger mounted on said housing to release said first spring, and a spring centering rod in said second spring having a stop thereon to limit bodily movement of said plate when said first spring is released.

8. A portable welding gun having a housing, a pair of laterally spaced guide rods extending slidably through and beyond said housing, a hollow nose secured to the rods at one end thereof, means on said housing for securing one end of a weld rod extending between said guide rods into said hollow nose, a friction latch plate in said housing apertured at one end for slidably receiving one of said guide rods when the plate is at a predetermined angle thereto and for frictionally engaging said rod when the angle of said plate is changed, a spring around said one rod abutting the apertured end of said plate normally to maintain it in unlatched position, a second spring abutting the other end of said plate to angle it into latching engagement with said one rod, a trigger mounted on said housing to release said first spring, and a spring centering rod in said second spring having a stop thereon to limit bodily movement of said plate when said first spring is released, said spring centering rod being mounted in said housing for adjustment longitudinally of said guide rods.

9. A portable welding gun having a housing, a pair of laterally spaced parallel guide rods extending slidably through and beyond said housing, a hollow nose secured to the rods at one end thereof, means on said housing for insulatively securing one end of a weld rod extending between said guide rods into said hollow nose, latch means in said housing adapted to engage one of said guide rods, adjustable means to limit movement of said latch means with said one rod, and a trigger on said housing to operate said latch means.

10. A portable welding gun having a housing, a guide rod extending slidably through and beyond said housing, a hollow nose secured to one end of said rod, means on said housing for insulatively securing one end of a weld rod extending into said nose in laterally spaced relation to said guide rod, indexing means in said housing to engage said guide rod for successive predetermined movements in one direction, and a trigger on said housing to operate said indexing means.

11. A portable welding gun having a housing, a guide rod extending slidably through and beyond said housing, a hollow nose secured to one end of said guide rod, means on said housing for insulatively securing one end of a weld rod extending into said hollow nose, latch means in the housing adapted to engage said guide rod, adjustable means to limit movement of the latch means with said guide rod, and a trigger on said housing to operate said latch means.

References Cited in the file of this patent
UNITED STATES PATENTS

| 2,498,241 | Bowen | Feb. 21, 1950 |
| 2,817,003 | Dusek | Dec. 17, 1957 |